Patented Dec. 24, 1929

1,740,771

UNITED STATES PATENT OFFICE

GEORG KRÄNZLEIN AND HEINRICH VOLLMANN, OF HOCHST-ON-THE-MAIN, GERMANY, ASSIGNORS TO GENERAL ANILINE WORKS, INC., OF NEW YORK, N. Y., A CORPORATION OF DELAWARE

BENZANTHRONE CARBOXYLIC ACIDS AND PROCESS OF PREPARING THEM

No Drawing. Application filed September 9, 1927, Serial No. 218,573, and in Germany September 20, 1926.

Our present invention relates to benzanthrone carboxylic acids and process of preparing them.

Previous attempts to prepare benzanthrone carboxylic acids by oxidation of alkyl benzanthrones have failed because the Bz-nucleus of the benzanthrone was always ruptured by the oxidation treatment. Thus by oxidizing for instance 2-methylbenzanthrone there was obtained anthraquinone-1.2-dicarboxylic acid and by oxidizing Bz-alkylbenzanthrones there were obtained α-anthraquinonylketones (see our co-pending U. S. patent application Ser. No. 193,946 filed May 24, 1927).

Now we have found that the methylbenzanthrones can be transformed with a good yield into benzanthrone carboxylic acids by a suitable alkaline oxidation i. e., by treatment with an oxidizing agent in the presence of alkali. The oxidation suitably may be carried out at temperatures between 100° C. and 200° C. This is the case both with the Bz-methylbenzanthrones and with the benzanthrones substituted in the anthraquinone nucleus by a methyl group. In this manner there is obtained from Bz-1-methylbenzanthrone the already known benzanthrone-Bz-1-carboxylic acid and from 2-methylbenzanthrone the hitherto unknown benzanthrone-2-carboxylic acid:

patent application Ser. No. 180,055 filed March 31, 1927) are heated, while stirring, to about 150° C. together with 120 parts of nitrobenzene and 20 parts of powdered caustic potash. After the reaction has set in, the mixture is cooled to about 80° C. and filtered by suction. The residue contains the potassium salt of the carboxylic acid. It is dissolved in water, the adhering nitrobenzene is separated by means of steam, the aqueous brownish-yellow solution is filtered and the filtrate is precipitated by means of a dilute acid. The product which separates as amorphous yellow flakes is filtered by suction, washed and dried.

Recrystallized from nitrobenzene it forms microscopic yellow needles melting at about 335° C. It dissolves in an aqueous sodium carbonate solution at atmospheric temperatures to a yellow solution. In concentrated sulfuric acid it is soluble to a pure golden-yellow solution with a yellow fluorescence. The product thus obtained is identical with the already known benzanthrone-Bz-1-carboxylic acid.

(2) 80 parts of 2-methylbenzanthrone are heated to about 130 to 140° C. with 50 parts of caustic potash in 480 parts of nitro-benzene. A reaction sets in with further self-heating and elimination of water which can be distilled off. After about ¼ hour the cooled reaction-mass is filtered by suction and further treated as indicated in Example (1).

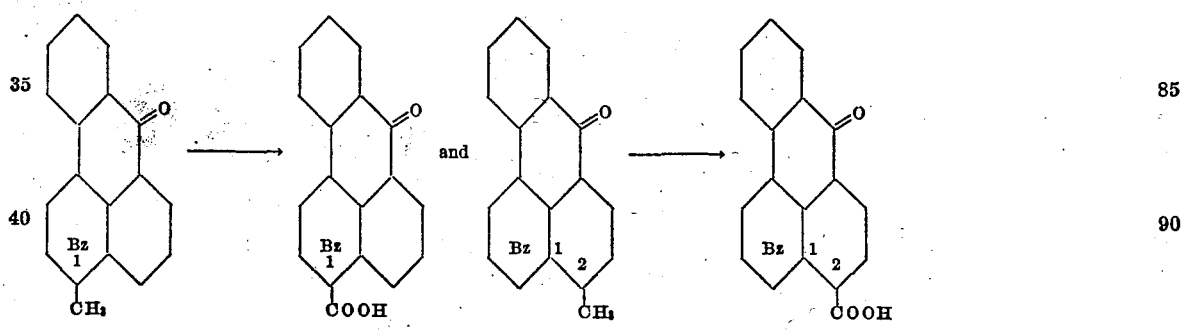

The following examples serve to illustrate our invention, but they are not intended to limit it thereto; the parts are parts by weight:

(1) 20 parts of Bz-1-methylbenzanthrone (obtainable according to our co-pending U. S.

Recrystallized from nitrobenzene, the carboxylic acid thus obtained forms yellow flat needles melting at about 307° C. to 308° C.

It dissolves in concentrated sulfuric acid to a red solution almost without fluorescence. Its solution in sodium carbonate or other alkali is yellow and shows when diluted with water an intense green fluorescence.

A benzanthrone carboxylic acid is obtained in a quite similar manner from Bz-2-methylbenzanthrone.

We claim:

1. The process of preparing a benzanthrone carboxylic acid consisting in treating a methyl benzanthrone with an oxidizing agent in the presence of an alkali.

2. The process of preparing a benzanthrone carboxylic acid consisting in treating 2-methylbenzanthrone with an oxidizing agent in the presence of an alkali.

3. The process of preparing a benzanthrone carboxylic acid consisting in treating a methyl benzanthrone with nitrobenzene in the presence of caustic potash.

4. The process of preparing a benzanthrone carboxylic acid consisting in treating 2-methylbenzanthrone with nitrobenzene in the presence of caustic potash.

5. The process of preparing a benzanthrone carboxylic acid consisting in treating a methyl benzanthrone with nitrobenzene in the presence of caustic potash at a temperature between 100° C. and 200° C.

6. The process of preparing a benzanthrone carboxylic acid consisting in treating 2-methylbenzanthrone with nitrobenzene in the presence of caustic potash at a temperature between 100° C. and 200° C.

7. The process of preparing benzanthrone-2-carboxylic acid consisting in treating 2-methylbenzanthrone with nitrobenzene in the presence of caustic potash at a temperature of 130° C. to 140° C.

8. The process of preparing benzanthrone-2-carboxylic acid consisting in treating 1 part of 2-methylbenzanthrone with 6 parts of nitrobenzene in the presence of about ½ part of caustic potash at a temperature of 130° C. to 140° C.

9. As a new product, benzanthrone-2-carboxylic acid of the following formula:

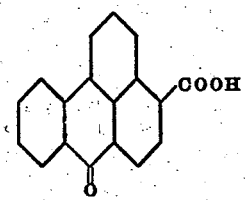

crystallizing from nitrobenzene in flat yellow needles melting at 307° C. to 308° C., dissolving in concentrated sulfuric acid to a red solution nearly without fluorescence, and in sodium carbonate or other alkali solution to a yellow solution which shows when diluted with water a strong green fluorescence.

In testimony whereof, we affix our signatures.

GEORG KRÄNZLEIN.
HEINRICH VOLLMANN.